Jan. 11, 1944.  H. A. JACOBS  2,339,170
AUTOMOBILE DOOR LOCK CONTROL DEVICE
Filed June 27, 1941  3 Sheets-Sheet 1
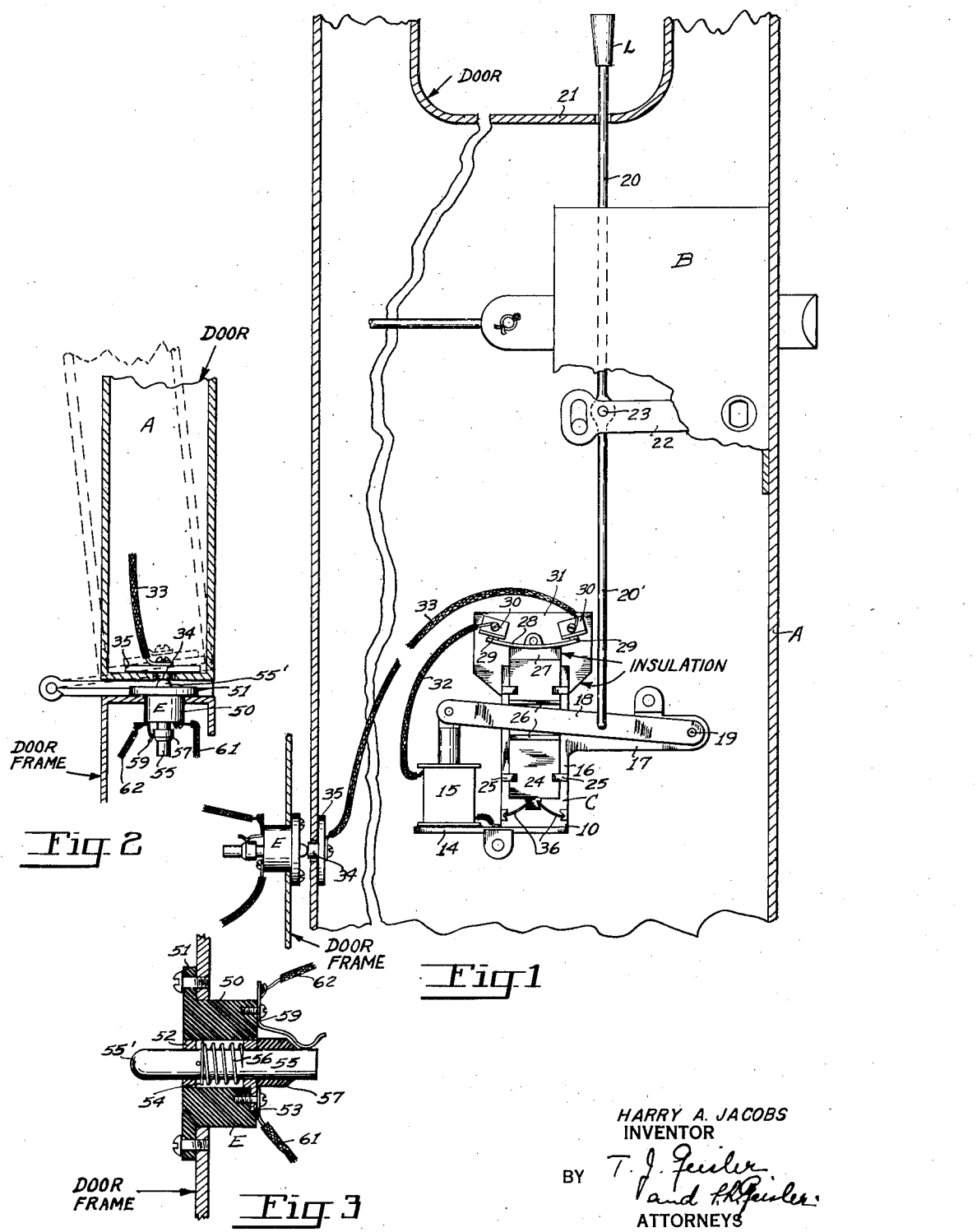
HARRY A. JACOBS
INVENTOR
ATTORNEYS

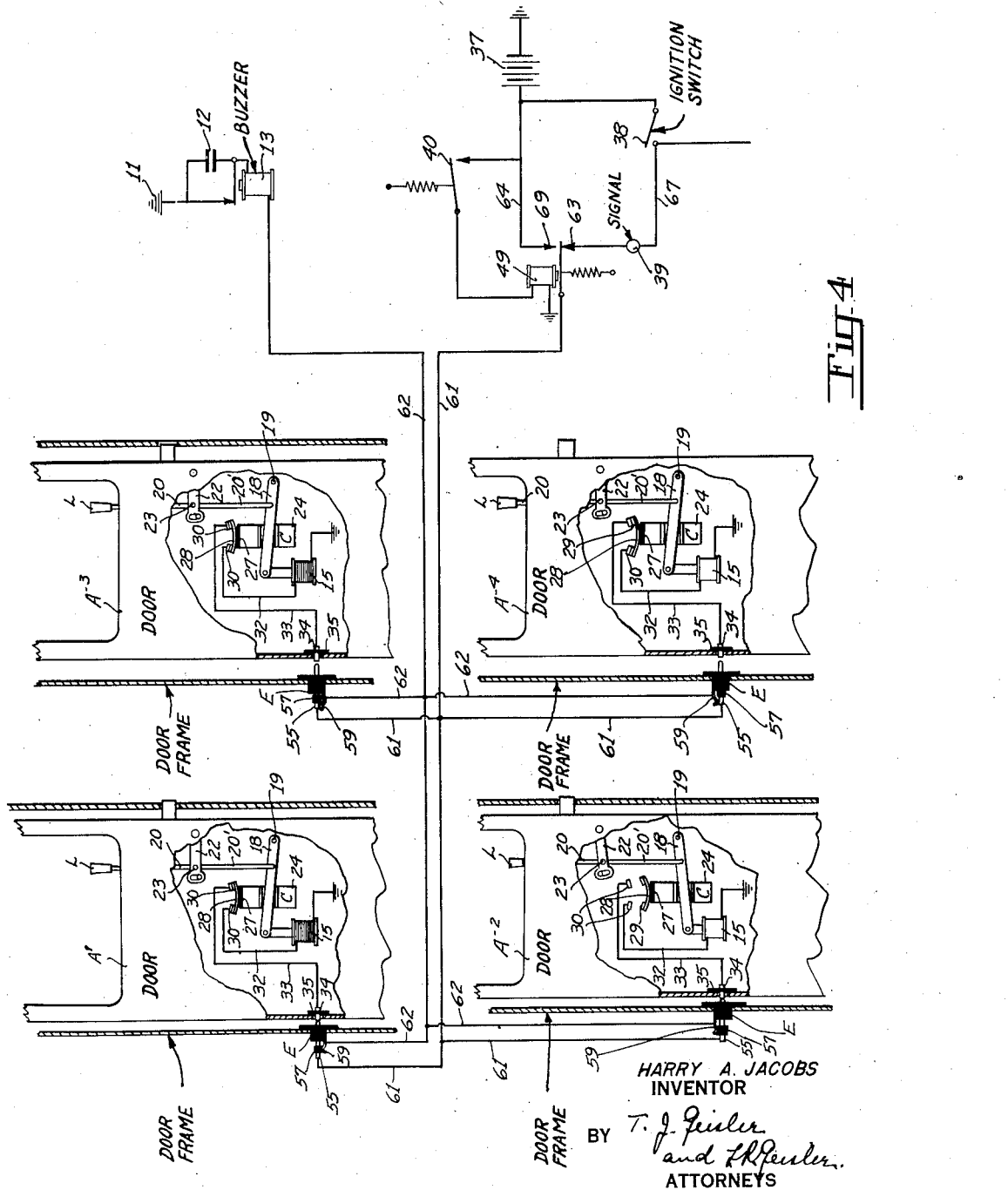

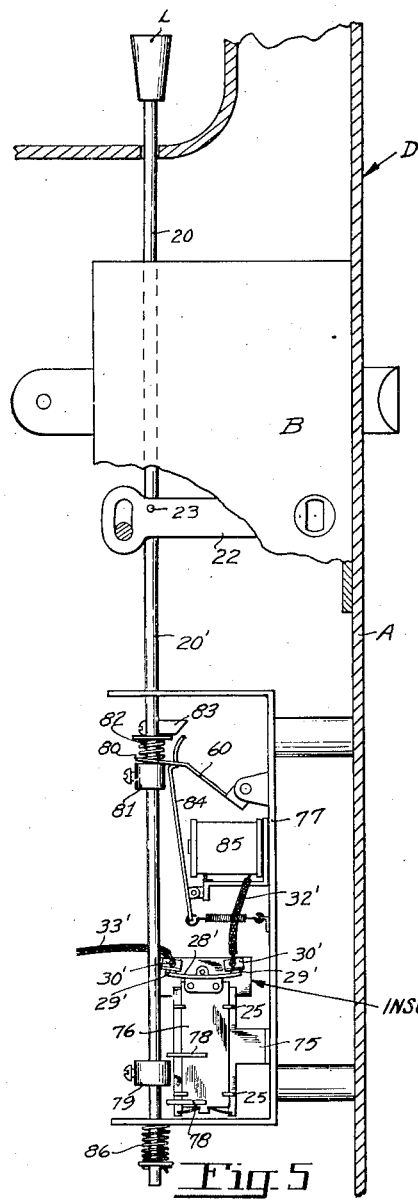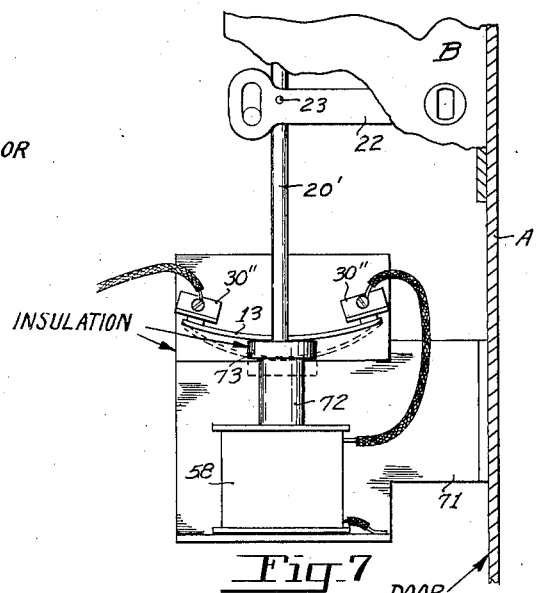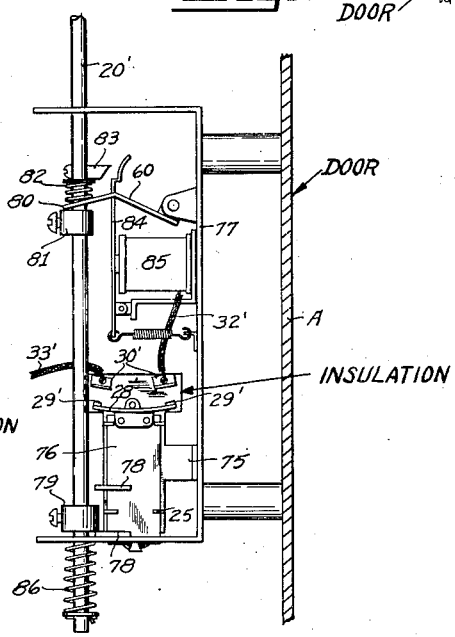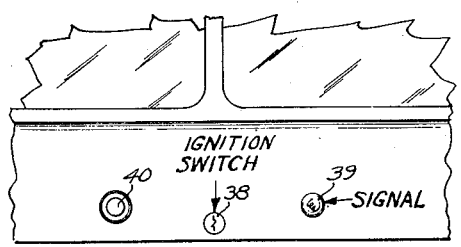

Patented Jan. 11, 1944

2,339,170

UNITED STATES PATENT OFFICE 2,339,170

AUTOMOBILE DOOR LOCK CONTROL DEVICE

Harry A. Jacobs, Portland, Oreg., assignor of fifty-one per cent to Gustave E. Berliner, Portland, Oreg.

Application June 27, 1941, Serial No. 399,994

5 Claims. (Cl. 177—314)

This invention relates to electrically-operated means for controlling the locks on motor vehicles and also relates to indicating means whereby the driver of a vehicle will be informed immediately whenever a door of the vehicle is open, improperly closed, or unlocked.

Various electrically-operated devices for locks on motor vehicles have been invented, as well as electrically-controlled safety devices for use in connection with automobile doors. Most of these devices however are complicated, expensive to install, and liable easily to get out of order. Other devices of this nature are objectionable because they dispense entirely with the manually-operated locking means customarily installed in vehicles, and thus make it impossible for the locking means to function, should the vehicle battery or electric circuit in the vehicle fail. Still other devices present the objectionable feature of requiring a constant use of electric energy in order to keep the vehicle doors properly locked, which continued use of energy causes a drain on the vehicle battery. As a result of these and other objections, such electrical or automatic controls for motor vehicle doors and locks have not yet been adopted to any extent into public use.

Nevertheless, the desirability of having such controls, especially in passenger automobiles of the sedan or closed type, is generally recognized. For instance, it is necessary that the driver of a passenger automobile, in the event that there are small children in the rear seat of the car, should be assured that the rear doors of the car are properly closed and locked, and to be sure that no door will be inadvertently opened or even unlocked without his knowledge. It is also desirable that one who is inside a vehicle which is not moving and in which the ignition has been turned off, should be able to lock all the vehicle doors from within instantly.

One of the objects of this invention is to provide a simple means whereby all the doors of the vehicle can be immediately locked by the driver of the vehicle while the vehicle is in operation.

Another object of this invention is to provide related means whereby all the vehicle doors can be instantly locked even though the vehicle is not in operation and without turning on the ignition.

Another object of this invention is to provide a means, located on the dashboard of the vehicle, for indicating to the driver the fact that a door of the vehicle has been unlocked, and similarly to indicate to the driver whenever a door has not been properly closed.

A further object is to provide such means in a vehicle which will meet the above requirements but which will cause only a negligible amount of current to be used from the vehicle battery, and further to arrange such means so that no current can be used by the door control or door locking system if the vehicle is unoccupied with the ignition turned off.

A still further object of this invention is to provide automatic control means for the locking of the vehicle doors which will not dispense with or interfere with the ordinary manually-operated locking means so that the latter may be used either from within or from wtihout the vehicle in the usual manner.

An additional and important object of this invention is furthermore to arrange the means suitable for carrying out the above mentioned objects in such a manner that very little change will be required in the door-locking mechanism of the ordinary motor vehicle, and to have the means and control system adapted to be set up in any ordinary motor vehicle with a minimum of work and expense.

The manner in which I attain these and incidental objects will be explained in the following description of the control circuit and associated means which I employ for carrying my invention into effect, in which description reference is to be had to the accompanying drawings.

In the drawings:

Fig. 1 is a sectional side elevation of a portion of a vehicle door, the section being taken from inside the vehicle, illustrating the locking mechanism carried by the door;

Fig. 2 is a fragmentary top sectional elevation of the adjacent portions of a vehicle door and door frame;

Fig. 3 is a sectional side elevation of the switch of Figs. 1 and 2, but drawn to a larger scale, by which switch electrical current is communicated to the door lock control mechanism on the door from the door frame of the vehicle, the switch being viewed in Fig. 3 from the side opposite that shown in Fig. 1;

Fig. 4 is a diagrammatic layout for a vehicle with four doors, illustrating the electrical circuit associated with each door and its relation to the central control located in the dashboard of the vehicle;

Fig. 5 is a fragmentary sectional side elevation, corresponding in part to Fig. 1, illustrating a slightly modified form of a door lock control mounted on the door, the elements being shown in their relative positions when the door is unlocked;

Fig. 6 is a fragmentary sectional side elevation corresponding to Fig. 5 but illustrating the position of such elements when the door is locked;

Fig. 7 is a fragmentary sectional side elevation of a door showing a still further modification in the door lock control; and Fig. 8 is a fragmentary view of the vehicle cowl or dashboard illustrating a convenient arrangement of the control switches and a warning signal which are necessary and important elements in my device.

The locking mechanism and control, carried on a vehicle door and suitable for use in my device, will first be described with reference to Figs. 1 and 2. It is to be understood that the same mechanism and control are located on each door of the vehicle. The door A has the usual car door latch B disposed therein. The construction, function and operation of such usual vehicle door latch are well known and need not be described. The latch B has also connected therewith the usual locking lever 22, which is manually operable by moving the knob L and connecting rod 20 down or up, the door being locked when the knob L and rod 20 are pushed down and unlocked when these are pulled up into the position shown in Fig. 1. The rod 20 extends upward through the sill 21 of the door window in the usual manner. Locks of this or similar types are common on all automobile doors. In my device the rod 20, which is pivotally connected to the locking lever 22 at 23 is provided with an extension 20' extending below the latch B.

An electrically-operated door-locking mechanism C is mounted on a frame 10 which in turn is secured to the door A. The frame 10 has a base 14 to which a solenoid coil 15 is secured, and a side 16 from which a horizontal arm 17 extends. A lever arm 18 is pivoted at one end to the frame arm 17, as indicated at 19, and its other end is connected to the core of the solenoid 15. The lower end of the rod extension 20' is connected to the lever arm 18, as shown in Fig 1. Thus the energizing of the solenoid 15 will cause the lever arm 18 to be pulled downwardly pulling the rod 20', 20 with it and moving the locking lever 22 downwardly into locking position.

A switch plate 24 is slidably mounted on the side 16 of the frame 10, this switch plate being slidable in suitable guides 25. This switch plate 24 has a pair of horizontal ridges or wings 26, extending perpendicularly to the plane of the switch plate and adapted to be engaged by the lever arm 18. Thus movement of the lever arm 18 up or down produces corresponding vertical movement of the switch plate 24.

A contact bar 28 is mounted on an insulating strip 27 secured to the top of the switch plate 24. The contact bar 28 carries a pair of contact points 29 at its ends, the bar and points constituting an electrical conductor connecting a pair of fixed electrical contacts 30, 30 when the switch plate is in raised position. The contact bar 28 is preferably made of flexible material so that the contact points 29 will always be pressed firmly against the contacts 30, when the plate is raised, to insure the closing of the contact, and also to permit the current to pass uninterruptedly to the solenoid until the solenoid has pulled the lever 18, and therewith the locking lever 22, a sufficient distance to lock the door latch before the current to the solenoid is broken at the contacts 30.

The fixed contact elements 30 are mounted on an insulating plate 31 which is secured to the side 16 of the frame 10. One of these contact elements is connected by conductor 32 to the coil of the solenoid, and the other contact element is connected by conductor 33 to an electrical contact button 34 mounted at the hinge edge of the door. The contact button 34 (Figs. 1 and 2) is attached to an insulating plate 35, which plate is secured to the door, and the contact button extends through a hole in the hinge edge of the door, which hole is slightly greater in diameter than the contact button, thus enabling the contact button to be entirely insulated from the metal of the door.

A spring toggle 36, disposed between the frame 10 and the bottom of the switch plate 24, prevents free movement of the switch plate when the plate is either in raised or lowered position and thus provides against any free movement of the plate and any accidental make or break of the electrical contacts, and also prevents the plate remaining in any position other than the extreme raised or extreme lowered positions.

The various means and control circuits, through the medium of which electrical current is caused to pass into the conductor 33 in the vehicle door, when the door is closed, will now be described with reference to the diagrammatic drawing constituting Fig. 4. In Fig. 4 it is assumed that the vehicle has four doors A', A$^2$, A$^3$, and A$^4$. The position of the elements in the door A' is the same as that of the door A in Fig. 1, and consequently the operation of the control circuits with respect to the door A' will be explained first.

The vehicle battery is indicated at 37 and the ignition switch for the vehicle is indicated at 38. A warning signal light 39, a push button switch 40, and an electric buzzer 13, or similar signal device, are also included in the control means, and ignition switch, signal light, and push button switch are preferably placed in a central convenient location on the dashboard, for example, as illustrated in Fig. 8, the rest of the elements in the control circuit being normally concealed.

An electro-magnetic switch 49 has its electromagnet in circuit with the push button switch 40 so that this electro-magnet will be energized whenever the push button switch is closed. The energizing of this electro-magnetic switch 49 operates to break the contact at 63 and close the contact at 69, the results of which will be explained later.

Referring now to Figs. 1 and 2, current passes to the contact button 34 of the door through the medium of a plunger switch E which is secured to the hinge edge of the door frame and the details of which are shown in Fig. 3. In Fig. 3 the plunger switch is viewed from the opposite side shown in Fig. 1. The plunger switch comprises a flanged body 50, of suitable insulating material, which extends through an aperture in the door frame, and the flange 51 of the body is firmly secured to the door frame. A central channel 54 extends through the body 50 and a metallic plunger 55 is mounted for axial reciprocation within the metal bushings 52 and 53 secured at each end of the channel 54. The plunger 55 has a rounded contact end 55' which is held normally in the extended position shown in Fig. 3 by a compression spring 56. The rounded end 55' of the plunger 55 is adapted to be engaged by the contact button 34 of the door, when the door is closed, as illustrated in Fig. 1.

An insulating collar 57 is secured near the other end of the plunger 55, but spaced slightly from the end. A bent spring contact arm 59, having one end secured to the switch body 50, is adapted to contact the plunger when the latter is in the extended position shown in Fig. 3; but this contact is broken by the insulating collar 57 whenever the plunger 55 is pushed in against the force of the compression spring 56 by the contact button 34, when the door is closed. A conductor 62 is connected to the contact arm 59 and another conductor 61, is connected to the metal bushing 53. The conductor 61, is thus electrically connected to the plunger 55 at all times, while the conductor 59 is electrically connected with the plunger only when the plunger is not engaged by the contact button 34 of the door. When the vehicle door is closed its contact button 34 will press the plunger 55 against the force of the spring 56 into the position illustrated in Fig. 1, but as soon as the vehicle door is opened the contact button 34 is no longer in contact with the plunger 55 and the plunger 55 returns to the extended position shown in Fig. 3.

Referring again to Fig. 4, the vehicle door A' is assumed to be closed but not locked, and the ignition switch 38 and push button switch 40, in the dashboard of the vehicle are both assumed to be opened, as shown. When the vehicle is to be started the ignition switch 38 must be closed, but the moment this switch is closed current from battery 37 passes through conductor 67, signal light 39, contact 63, conductor 61, plunger 55 (adjacent door A'), contact button 34 of door A', conductor 33 of door A', connected contacts 30, conductor 32, and solenoid 15. From the solenoid 15 the current is grounded in the metal wall of the door. Thus with the elements in this position the circuit is closed and the signal light 39 will remain lighted. Since the current through the circuit under this condition must however pass through the light bulb 39, and preferably only a small light is used, the current will not be strong enough to energize the solenoid sufficiently to operate the locking mechanism of the door A'. Should this door now be manually locked the circuit would be broken at the contacts 30—30 in door A'.

With the door A' closed, but not locked as shown in Fig. 4, the closing of the push button switch 40 will energize the electro-magnet 49 and close the contact 69. Current from the battery will then pass over conductor 64, contact 69, conductor 61, etc., to solenoid 15. This current however will be strong enough to energize solenoid 15 of door A' to lock the door in the manner previously described. When the push button switch 40 is released, the door A' will remain locked, the contact 69 will open, and the contact 63 will again close; but this will not cause the light 39 to be lighted, as far as door A' is concerned, even though the ignition switch remains turned on, since the contacts 30—30 of door A' are now open. When the door A' is locked the elements of the door lock control will be in the same position as in door A².

Thus the push button switch 40 will operate to lock the door A' regardless of whether the vehicle is being operated or not and regardless of whether or not the ignition switch 38 is turned on. In the event the vehicle should be parked with the ignition switch turned off, any person within the vehicle could instantly lock the closed door A' merely by pressing the push button switch 40 in the dashboard of the vehicle. When a door of the vehicle is closed and locked no further current will pass into the locking control mechanism of that door regardless of whether the ignition switch 38 or the push button switch 40 are closed or not. When the door is once locked it must be unlocked manually, the same as any ordinary vehicle door.

In Fig. 4 the door A³, assumed to be partly open (for example, the latch may be on the first catch in the door frame), and the door A⁴, assumed to be wide open, in either case the contact buttons of these doors will not engage the respective plungers 55 in the adjacent door frame. These plungers will therefore be in extended position, such as that shown in Figure 3. With the closing of the ignition switch 38, or the closing of the push button switch 40, no current consequently can pass into the locking controls of these doors A³ and A⁴.

However, when the doors A³ and A⁴ are in these positions, the corresponding plungers 55, which are in extended position, will have their contacts closed with their spring contact arms 59, in the manner illustrated in Fig. 3. Closing of the ignition switch 38 will then cause current to pass through conductor 67, lamp 39, contact 63, and conductor 61, to the plunger 55 (in the manner previously described), but, since the contacts 59 are also closed, the current will continue through conductor 62 to the buzzer coil 13 which is grounded in the vehicle at 11. This will close the circuit through the light 39 and buzzer 13 and cause the light 39 to be lighted. If only a small light is used the current passing through the circuit will not be sufficient to actuate the buzzer. In other words, should any attempt be made to operate the vehicle without all the doors being entirely closed and locked, the warning signal light 39 will be lighted and will remain lighted until the doors are closed and locked. Similarly, should one of the doors of the vehicle be opened, while the vehicle ignition switch is turned on, or should one door even be unlocked, the warning light 39 in the dashboard will immediately be lighted and remain lighted, thus warning the driver of the vehicle, until either all the doors are closed and locked or the ignition is turned off.

If one of the doors is open, such as door A⁴, or only partly open, such as A³, the closing of the push button switch 40 will energize electro-magnet 49 and close the contact 69, whereupon current will pass from the battery 37 over conductor 64, contact 69, conductor 61, plunger 55, contact arm 59, and conductor 62, to buzzer 13. The current through this circuit will be strong enough to actuate the buzzer 13.

Thus, with my device constructed in the manner described, the following results are attained:

1. When the ignition switch is turned on: (a) If all doors are not properly closed and locked, the warning light will light and remain lighted until the doors are closed and locked or until the ignition is turned off. (b) Subsequent opening of one door will not effect the locking of the other doors nor stop operation of the vehicle, but will cause the warning light to remain lighted until the door is closed and locked.

2. When the push button switch is pressed in, regardless of whether the ignition switch is turned on or not: (a) All closed doors will be immediately locked. (b) If any doors are not properly closed the warning buzzer will be sounded.

3. When the ignition switch and push button switch are both open: (a) Doors may be locked and unlocked only manually. (b) The unlocking and opening of the doors will not cause current from the vehicle battery to pass to any of the electrical elements.

If it is desired a small condenser 12 (thus a .5 mf. condenser), may be added across the buzzer contacts, to prolong the life of the buzzer. However, the buzzer would last for a long time even without such condenser.

In Figs. 5 and 6 I show a modified form in which the lock control on the vehicle door may be made. In this modified construction the current in the control system is used to energize a magnetic coil which in turn releases a trigger permitting the door to be locked by means of a compression spring which acts to pull the locking rod down into locking position. In Figs. 5 and 6 a supporting frame 77, is secured to the door in any suitable manner. A supporting bracket is attached to the frame 77 and a sliding switch plate 76 is mounted for up and down movement on the bracket 75. The sliding plate 76 carries a pair of rigid, horizontally-extending arms or wings 78 which are arranged so as to be engaged by a collar 79 adjustably secured to the locking rod 20'. The sliding plate 76 is similar to the sliding plate 24 of Fig. 1 and carries a contact bar 28' with contact points 29' at each end, adapted, when the plate is raised, to close the circuit between the stationary contacts 30' (these members corresponding to the members 28, 29 and 30 of Fig. 1, respectively). Closing the circuit between contacts 30', 30' permits current to pass from conductor 33' through conductor 32' to the magnetic coil 85.

The locking rod 20' extends through the top and bottom of frame 77 and is slidably mounted therein. A spring 86 is mounted on the rod 20 below the bottom of frame 77, as shown, and, when the rod is released, this spring operates to pull the rod downwardly so as to lock the door.

A pivoted arm 60 has a bifurcated end 80 which is held against a collar 81 on the rod 20' by a spring 82. The spring 82 is held under slight tension between the bifurcated end 80 of the arm 60 and a tripping member 83 carried on the rod 20'.

A hinged latch member 84 engages the arm 60 when the latter is in the raised position shown in Fig. 5, but, when the latch member 84 is pulled out of engagement with the arm 60, the spring 86 is then free to draw the rod 20 downwardly. In Fig. 5 the rod 20—20' is shown in unlocking position after it has been pulled manually upwardly in the usual manual operation of unlocking the vehicle door. When the members are in this position however the energizing of the magnetic coil 85 will cause the latch member 84 to be pulled to the right, releasing the arm 60, and permitting the spring 86 to pull the rod 20—20' into locking position. The energizing of the magnetic coil 85 occurs under the same conditions as the energizing of the solenoid 15 in Fig. 1.

The door may however also be locked manually since the pressing down of the rod 20—20', when the members are in the position shown in Fig. 5, will cause the tripping member 83 to compress spring 82 until the tripping member engages the top end of the latch 84; whereupon the latch 84 will be pushed to the right. This causes the latch 84 to disengage the arm 60 and when this occurs the rod 20 will be moved downwardly under the force of spring 86 as previously described.

Fig. 7 illustrates a still further modification which may be made in the lock control on the vehicle door. This additional modification embodies a somewhat simplified construction in which a direct pull is exerted by a solenoid 58 upon locking rod 20'. The solenoid 58 is mounted on a frame 71 which is secured to the door. The rod 20' may be secured to, or made a part of, the solenoid core 72. An insulating segment 73 is secured to the rod 20' and contact bar 13 is mounted therein. When the rod 20' is in raised or unlocking position the contact bar completes the circuit through the stationary contacts 30'' enabling the solenoid 58 to be energized. The energizing of the solenoid 58 occurs under the same conditions as the energizing of the solenoid 15 of Fig. 1.

The simplified construction illustrated in Fig. 7 may be used when the door-locking mechanism is so constructed that only a light pull is required to pull the rod 20' down into the locking position. Such a condition may be arranged for by providing additional leverage in the ordinary vehicle door-locking mechanism.

Obviously various other modifications will suggest themselves in the arrangement or construction of the locking control in the vehicle door. All that is necessary in this part of the means required for carrying out my invention is to have a suitable, electrically-operable device carried on each door of the vehicle which will function to lock the closed door when the electric current is directed through the central control circuit, but which will not otherwise alter the manual control of the mechanical door-locking means.

Similar modifications might be made in the individual members of my central control circuit without departing from the principles of my invention. It is not my invention to limit my invention to any particular switch elements or the like, so long as the general mode of operation and control, for the purposes mentioned, in the manner described, is followed.

I claim:

1. In an electrical door control, a door carrying a lock, electrically-operable means on said door for locking said lock, a circuit breaker in said means preventing the passage of current therethrough whenever said lock is locked, a door-operated switch in the frame of said door connecting with said means only when said door is closed, a source of electrical energy, a circuit connecting said door switch with said source of electrical energy, a key switch located in and controlling said circuit, a signal element in said circuit, said signal element so arranged that the current of said circuit will pass through said signal element and the amount be limited thereby, a second circuit connecting said source of electrical energy with said door switch, a manual switch controlling said second circuit, grounding connections for said source of electrical energy and said door-locking means, whereby when said door is shut, but unlocked, said first and second-mentioned circuits may be separately closed through said door-locking means by operating said key switch and said manual switch respectively, said circuits and door-locking means so arranged that the closing of said first circuit through said door-locking means will cause said signal element to function but will not produce sufficient current to operate said door-locking means while the similar closing of said second circuit will cause said door lock to be locked.

2. In an electrical door control of the character described, a door carrying a lock, electrically-operable means on said door for locking said lock, a circuit breaker in said means preventing the passage of current therethrough whenever said lock is locked, a door-operated switch in the frame of said door connecting with said means only when said door is closed, a source of electrical energy, a circuit connecting said door switch with said source of electrical energy, a key switch located in and controlling said circuit, a signal element in said circuit, said signal element adapted and arranged to limit the amount of current passing through said circuit, a second circuit connecting said source of electrical energy with said door switch, a manual switch controlling said second circuit, grounding connections for said source of electrical energy and said door-locking means, whereby when said door is shut, but unlocked, said first and second-mentioned circuits may be separately closed through said door-locking means by operating said key switch and said manual switch respectively, said circuits and door-locking means so arranged that the closing of said first circuit through said door-locking means will cause said signal element to function but will not produce sufficient current to operate said door-locking means while the similar closing of said second circuit will cause said door lock to be locked, a third circuit associated with said door switch and adapted to be connected thereby to said first and second circuits whenever said door is open, a grounding connection in said third circuit, whereby when said door is open, said first circuit may be closed through said third circuit by operating said key switch, and the closing of said first-mentioned circuit with said door open will cause said first-mentioned signal element to function as long as said door remains open.

3. In an electrical door control of the character described, a door carrying a lock, electrically-operable means on said door for locking said lock, a circuit breaker in said means preventing the passage of current therethrough whenever said lock is locked, a door-operated switch in the frame of said door connecting with said means only when said door is closed, a source of electrical energy, a circuit connecting said door switch with said source of electrical energy, a key switch located in and controlling said circuit, a signal element associated with said circuit and limiting the amount of current passing through said circuit, a second circuit connecting said source of electrical energy with said door switch, a manual switch controlling said second circuit, grounding connections for said source of electrical energy and said door-locking means, whereby when said door is shut, but unlocked, said first and second-mentioned circuits may be separately closed through said door-locking means by operating said key switch and said manual switch respectively, said circuits and door-locking means so arranged that the closing of said first circuit through said door-locking means will cause said signal element to function but will not produce sufficient current to operate said door-locking means while the similar closing of said second circuit will cause said door lock to be locked, a third circuit associated with said door switch and adapted to be connected thereby to said first and second circuits whenever said door is open, a grounding connection in said third circuit, a second signalling device in said third circuit, whereby when said door is open, said first and said second circuits may be separately closed through said third circuit by operating said key switch and said manual switch respectively, said second signaling device being of a different character from said first mentioned signal element.

4. The combination set forth in claim 3 with said second signalling device so arranged as to require more current for its operation than obtainable through said first-mentioned circuit so that said second signalling device will be energized only by the closing of said manual switch when said door is open.

5. In a vehicle door control, a door carrying a lock, electric contact means carried on said door and associated with said lock, said contact means having a grounding circuit, a circuit breaker in said means arranged to interrupt said grounding circuit whenever said lock is locked, a door-operated switch in the frame of said door connecting with said means only when said door is closed, a vehicle battery, a circuit connecting said door switch with said vehicle battery, a key switch located in and controlling said battery circuit, a signal element associated with said circuit, a grounding connection for said battery, a supplemental circuit associated with said door switch and adapted to be connected thereby to said battery circuit whenever said door is open, a grounding connection in said supplemental circuit, whereby, when said key switch is closed, current will pass through said battery circuit, door switch, and door electric contact means, to cause said signal element to be energized if said door is closed but unlocked, and similarly current will pass through said battery circuit, door switch, and said supplemental circuit, to cause said signal element to be energized if said door is open.

HARRY A. JACOBS.